(12) United States Patent
Mashiko et al.

(10) Patent No.: US 6,846,762 B2
(45) Date of Patent: Jan. 25, 2005

(54) OPTICAL GLASS

(75) Inventors: Shinya Mashiko, Sagamihara (JP); Masahiro Onozawa, Sagamihara (JP)

(73) Assignee: Kabushiki Kaisha Ohara, Kanagawa-ken (JP)

(*) Notice: Subject to any disclaimer, the term of this patent is extended or adjusted under 35 U.S.C. 154(b) by 106 days.

(21) Appl. No.: 10/403,117

(22) Filed: Mar. 31, 2003

(65) Prior Publication Data
US 2003/0191007 A1 Oct. 9, 2003

(30) Foreign Application Priority Data
Apr. 2, 2002 (JP) .......................... 2002-099509

(51) Int. Cl.⁷ .................. C03C 3/089; C03C 3/091; C03C 3/93
(52) U.S. Cl. .............. 501/65; 501/66; 501/67; 501/903
(58) Field of Search ............... 501/65, 66, 67, 501/903

(56) References Cited

U.S. PATENT DOCUMENTS

| | | | |
|---|---|---|---|
| 4,149,895 A | | 4/1979 | Boudot et al. |
| 4,526,874 A | * | 7/1985 | Grabowski geb. Marszalek et al. .............. 501/77 |
| 4,812,423 A | * | 3/1989 | Kodama et al. ............... 501/55 |
| 4,822,758 A | * | 4/1989 | Boudot et al. ................ 501/65 |
| 6,551,952 B2 | * | 4/2003 | Wolff et al. .................. 501/68 |

FOREIGN PATENT DOCUMENTS

WO    WO 96/27561    9/1996

OTHER PUBLICATIONS

EPO Search Report, Application No. 03007074, Jul. 14, 2003.

* cited by examiner

*Primary Examiner*—Karl Group
(74) *Attorney, Agent, or Firm*—Hedman & Costigan, P.C.

(57) ABSTRACT

An optical glass which is free of PbO which causes environmental pollution and also is free of expensive $Ta_2O_5$ and $Nb_2O_5$ comprises, in mass %,

| | |
|---|---|
| $SiO_2$ | 40–60% |
| $B_2O_3$ | 1 to less than 5% |
| $Al_2O_3$ | 0–3% |
| $TiO_2$ | 15.5–19% |
| $ZrO_2$ | 0–1% |
| $WO_3$ | 0–5% |
| ZnO | 0–5% |
| CaO | 0–4% |
| SrO | 0–10% |
| BaO | 10.5–20% |
| $Na_2O + K_2O$ | 11–20% |
| in which $Na_2O$ | 0–9% |
| and $K_2O$ | 6–20% |
| a refining agent | 0–1% | and has optical constants of a refractive index (nd) within a range from 1.55 to less than 1.67 and an Abbe number (vd) within a range from 30 to 45.

3 Claims, No Drawings

OPTICAL GLASS

BACKGROUND OF THE INVENTION

This invention relates to an optical glass having optical constants of a refractive index (nd) within a range from 1.55 to less than 1.67 and an Abbe number (vd) within a range from 30 to 45.

As optical glasses having optical constants within the above described ranges, the Glass Composition Data Book 1991 published by Japan Glass Product Industry Association disclose compositions of barium flint glass (BaF4) and heavy barium flint glass (BaSF3, BaSF4 and BaSF6). These glasses have the advantage that the cost of raw materials is relatively low but contain PbO and $As_2O_3$ which cause the environmental pollution and waste glass and sludge which are produced when these glasses are processed pollute the environment. Besides, since PbO is an ingredient which increases specific gravity of the glass, the weight of an optical instrument increases if such glass is used for a lens of the optical instrument. For these reasons, there is a great demand for an optical glass which is free of PbO and $As_2O_3$. Since, however, PbO among these ingredients has a great influence on optical and chemical properties of glass, it has been difficult to develop an optical glass which has optical and chemical properties which are equivalent to the glass containing PbO and still is free of PbO.

As optical glasses having optical constants within the above described ranges and being free of PbO and $As_2O_3$, Japanese Patent Application Laid-open Publication No. 52-25812 discloses an optical glass of a $SiO_2$—$Nb_2O_5$—$TiO_2$—$R_2O$ system. Japanese Patent Application Laid-open Publication No. 52-45612 discloses an optical glass of a $SiO_2$—$Nb_2O_5$—$R_2O$—RO system. Japanese Patent Application Laid-open Publication No. 6-107425 discloses an optical glass of a $SiO_2$—$B_2O_3$—$TiO_2$—$Nb_2O_5$—BaO—$R'_2O$ system. These glasses, however, have the following disadvantages:

(1) Since these glasses contain $Nb_2O_5$ which is a very expensive ingredient as an essential ingredient, the cost of raw materials of the glass becomes high.

(2) In a case where raw materials of the glass are melted in a large scale production, the raw materials are put in a crucible in several divided parts. Since $Nb_2O_5$ is a bulky material, the glass containing $Nb_2O_5$ must be put in the crucible in a larger number of divided parts than a glass which does not contain $Nb_2O_5$ even if the melting property of these glasses is the same. Thus the glass containing $Nb_2O_5$ requires longer total time for placing the raw materials in the crucible with resulting increase in the manufacturing cost.

In the glasses of Japanese Patent Application Laid-open Publication No. 52-25812 and Japanese Patent Application Laid-open Publication No. 52-45612, a part of $Nb_2O_5$ may be substituted by $Ta_2O_5$. Since, however, $Ta_2O_5$ is more expensive than $Nb_2O_5$, the disadvantage of the high cost cannot be eliminated even if such substitution is made.

Costs of raw materials usually vary with lapse of time but the costs of $Ta_2O_5$ and $Nb_2O_5$ are permanently high. Since the cost of raw materials of the barium flint glass and heavy barium flint glass which contain PbO and $As_2O_3$ is low, the cost of glass products using these glasses is also low. For this reason, there is a strong demand by users such as manufacturers of optical instruments for an optical glass which has the above described optical constants and does not contain PbO or $As_2O_3$ which is detrimental to the environment and moreover is low in the cost of the raw materials and therefore low in the cost of the resulting products.

It is, therefore, an object of the present invention to provide an optical glass which has eliminated the above described disadvantages of the prior art optical glasses and has optical constants of a refractive index (nd) within a range from 1.55 to less than 1.67 and an Abbe number within a range from 30 to 45, is free of ingredients such as PbO which is detrimental to the environment and also is free of expensive ingredients such as $Ta_2O_5$ and $Nb_2O_5$ and, therefore, has little likelihood of the environmental pollution and can be manufactured at a low cost.

SUMMARY OF THE INVENTION

The laborious studies and experiments made by the inventors of the present invention have resulted in the finding, which has led to the present invention, that the above described object of the invention can be achieved in a glass of a $SiO_2$—$B_2O_3$—$TiO_2$—BaO—$K_2O$ system.

For achieving the object of the present invention, there is provided an optical glass comprising, in mass %,

| | |
|---|---|
| $SiO_2$ | 40–60% |
| $B_2O_3$ | 1 to less than 5% |
| $Al_2O_3$ | 0–3% |
| $TiO_2$ | 15.5–19% |
| $ZrO_2$ | 0–1% |
| $WO_3$ | 0–5% |
| ZnO | 0–5% |
| CaO | 0–4% |
| SrO | 0–10% |
| BaO | 10.5–20% |
| $Na_2O + K_2O$ | 11–20% |
| in which $Na_2O$ | 0–9% |
| and $K_2O$ | 6–20% |
| a refining agent | 0–1% | and having optical constants of a refractive index (nd) within a range from 1.55 to less than 1.67 and an Abbe number (vd) within a range from 30 to 45.

In one aspect of the invention, there is provided an optical glass comprising, in mass %,

| | |
|---|---|
| $SiO_2$ | 45–60% |
| $B_2O_3$ | 1 to less than 5% |
| $Al_2O_3$ | 0–3% |
| $TiO_2$ | 16–19% |
| $ZrO_2$ | 0–1% |
| $WO_3$ | 0–5% |
| ZnO | 0–5% |
| CaO + SrO + BaO | 11–20% |
| in which CaO | 0–4% |
| SrO | 0–8% |
| and BaO | 11–20% |
| $Na_2O + K_2O$ | 11–20% |
| in which $Na_2O$ | 0–9% |
| and $K_2O$ | 6–20% |
| a refining agent | 0–1% | and having optical constants of a refractive index (nd) within a range from 1.55 to less than 1.67 and an Abbe number (vd) within a range from 30 to 45.

In another aspect of the invention, the optical glass comprises $Sb_2O_3$ in an amount of 0–1% in mass % as the refining agent.

DETAILED DESCRIPTION OF THE INVENTION

Reasons for selecting the respective ingredients in the above described compositions of the optical glass of the present invention will be described below. In the following description, amounts of the respective ingredients are expressed in mass %.

The $SiO_2$ ingredient is a glass forming oxide. If the amount of this ingredient is less than 40%, chemical durability of the glass deteriorates whereas if the amount of this ingredient exceeds 60%, difficulty arises in achieving the target optical constants. For obtaining a glass which has excellent chemical durability, 45% or over of this ingredient should preferably be added.

The $B_2O_3$ ingredient is a glass forming oxide. If the amount of this ingredient is less than 1%, melting property of the glass deteriorates whereas if the amount of this ingredient is 5% or over, resistance to devitrification of the glass deteriorates.

The $Al_2O_3$ ingredient may be added for improving chemical durability and stability of the glass. If the amount of this ingredient exceeds 3%, melting property of the glass deteriorates and resistance to devitrification deteriorates rather than improves.

The $TiO_2$ ingredient is an important ingredient which is indispensable for obtaining a glass having the target optical constants without using expensive materials such as $Ta_2O_5$ or $Nb_2O_5$ and also is effective for improving chemical durability without deteriorating melting property of the glass. If the amount of this ingredient is less than 15.5%, it becomes difficult to maintain the target optical constants and obtain the above described effects. If the amount of this ingredient exceeds 19%, light transmittance of the glass deteriorates. For obtaining a glass which has excellent chemical durability and target optical constants, 16% or over of this ingredient should preferably be added.

The $ZrO_2$ ingredient may be optionally added for adjusting optical constants and maintaining chemical durability of the glass. For this purpose, addition of this ingredient up to 1% will suffice. If the amount of this ingredient exceeds 1%, the following problems (1) to (3) will arise:
(1) Stability of the glass during melting deteriorates and tendency to devitrification occurs in the glass.
(2) Tendency to devitrification occurs in the glass when cooled and solidified glass is re-heated for precision annealing or press forming.
(3) A part of the material of the $ZrO_2$ ingredient is left unmelted with resulting deterioration in melting property of the glass.

The problem (3) may be solved in some cases by raising the melting temperature but, when the melting temperature is raised, the amount of platinum which melts into the glass from a platinum crucible used for melting of the glass increases with resulting deterioration in light transmittance of the glass.

Since the $ZrO_2$ ingredient is an expensive material, it is preferable for the glass not to contain this ingredient for reducing the cost of the raw materials.

The $WO_3$ ingredient is effective for lowering liquidus temperature, improving resistance to devitrification and adjusting optical constants and may be optionally added. If the amount of this ingredient exceeds 5%, light transmittance of the glass deteriorates. Since the $WO_3$ ingredient is an expensive ingredient, it is preferable not to add this ingredient for reducing the cost of the raw materials.

The ZnO ingredient may be optionally added for adjusting optical constants and improving chemical durability of the glass. Addition of this ingredient up to 5% will suffice.

The CaO and SrO ingredients may be optionally added for adjusting optical constants and improving melting property of the glass. If the amount of these ingredients exceed 4% and 10% respectively, there occurs devitrification tendency of the glass. For obtaining a glass which has excellent resistance to devitrification, the amount of the SrO ingredient should preferably be up to 8%.

The BaO ingredient is effective for increasing refractive index and improving resistance to devitrification of the glass and is an essential ingredient in the optical glass of the present invention. For achieving these effects satisfactorily, it is necessary to add this ingredient in the minimum amount of 10.5%. If, however, the amount of this ingredient exceeds 20%, resistance to devitrification of the glass deteriorates rather than improves. For obtaining an optical glass having a desired refractive index and excellent resistance to devitrification, it is preferable to add this ingredient in the amount of 11% or over. For maintaining excellent chemical durability of the glass, the total amount of the CaO, SrO and BaO ingredients should preferably be within a range from 11% to 20%.

The $Na_2O$ ingredient is effective for improving melting property of the glass and may be optionally added. If the amount of this ingredient exceeds 9%, chemical durability of the glass deteriorates.

The $K_2O$ ingredient is an essential ingredient in the optical glass of the present invention because this ingredient is very effective for improving melting property of the glass. If the amount of this ingredient is less than 6%, this effect cannot be achieved satisfactorily with resulting deterioration in the melting property. If the amount of this ingredient exceeds 20%, chemical durability of the glass deteriorates.

For improving melting property of the glass, it is necessary to add the $Na_2O$ and $K_2O$ ingredients in the total amount of 11% or over. If the total amount of these ingredients is less than 11%, melting property of the glass deteriorates. If, however, the total amount of these ingredients exceeds 20%, chemical durability of the glass deteriorates.

The deterioration of melting property of the glass can be eliminated in some cases by raising the melting temperature of the glass but, in this case, light transmittance of the glass deteriorates for the previously described reason.

For obtaining a foamless, homogeneous glass, a known refining agent may be optionally added. Addition of the refining agent up to 1% will suffice. As known refining agents, $Sb_2O_3$, $As_2O_3$, a fluoride and a chloride may be cited. Among them, it is preferable not to add $As_2O_3$ for avoiding the environmental pollution as described previously.

Further, since a fluoride and a chloride have the problem that they tend to evaporate when the glass is melted and refined, it is preferable to add $Sb_2O_3$ as a refining agent in an amount of up to 1%.

EXAMPLES

Description will be made below about examples of the optical glass according to the invention. The scope of the invention however is not limited to these examples. The following Tables 1–4 show compositions of Examples Nos. 1–21 of the optical glass of the present invention and Comparative Examples A, B and C as well as refractive index (nd) and Abbe number (vd) of these examples and comparative examples.

TABLE 1

| No. | Examples | | | | | |
|---|---|---|---|---|---|---|
| | 1 | 2 | 3 | 4 | 5 | 6 |
| $SiO_2$ | 40.00 | 43.00 | 42.00 | 45.00 | 45.00 | 45.00 |
| $B_2O_3$ | 1.50 | 1.00 | 1.00 | 2.00 | 1.00 | 1.50 |
| $Al_2O_3$ | 3.00 | 2.10 | 0.95 | 1.00 | 0.90 | 0.40 |
| $TiO_2$ | 16.50 | 18.50 | 16.00 | 16.50 | 18.00 | 16.50 |
| $ZrO_2$ | | | 1.00 | | | |
| $WO_3$ | | | 2.00 | | | |
| ZnO | 2.40 | 1.00 | | | | |
| CaO | 4.00 | 2.00 | 4.00 | 0.50 | | 4.00 |
| SrO | | 2.00 | | 8.50 | | 4.00 |
| BaO | 16.00 | 12.00 | 13.00 | 11.00 | 20.00 | 11.00 |
| $Na_2O$ | 4.50 | 7.50 | 9.00 | 0.50 | 6.50 | 6.50 |
| $K_2O$ | 12.00 | 10.00 | 11.00 | 15.00 | 8.50 | 11.00 |
| $Sb_2O_3$ | 0.10 | 0.90 | 0.05 | | 0.10 | 0.10 |
| nd | 1.65212 | 1.648857 | 1.64775 | 1.637209 | 1.66059 | 1.59674 |
| vd | 39.0 | 37.1 | 39.1 | 39.4 | 38.5 | 40.9 |

TABLE 2

| No. | Examples | | | | | |
|---|---|---|---|---|---|---|
| | 7 | 8 | 9 | 10 | 11 | 12 |
| $SiO_2$ | 45.50 | 45.50 | 47.00 | 47.00 | 47.90 | 49.00 |
| $B_2O_3$ | 2.40 | 2.00 | 4.00 | 1.00 | 2.00 | 2.50 |
| $Al_2O_3$ | | | 2.00 | 3.00 | 1.00 | 1.00 |
| $TiO_2$ | 16.00 | 18.00 | 19.00 | 18.00 | 16.50 | 16.50 |
| $ZrO_2$ | 0.50 | 1.00 | | 0.78 | | |
| $WO_3$ | | 5.00 | | | | |
| ZnO | 5.00 | | | | | |
| CaO | 0.50 | 2.50 | 0.50 | 2.20 | 1.00 | 2.00 |
| SrO | 8.00 | | | 1.00 | | |
| BaO | 11.00 | 11.00 | 12.49 | 12.00 | 11.50 | 12.40 |
| $Na_2O$ | 2.00 | 3.40 | 9.00 | 6.50 | | 6.50 |
| $K_2O$ | 9.00 | 11.50 | 6.00 | 8.50 | 20.00 | 10.00 |
| $Sb_2O_3$ | 0.10 | 0.10 | 0.01 | 0.02 | 0.10 | 0.10 |
| nd | 1.644248 | 1.643343 | 1.637631 | 1.638268 | 1.61863 | 1.62622 |
| vd | 39.1 | 36.7 | 36.8 | 37.4 | 39.2 | 39.2 |

TABLE 3

| No. | Examples | | | | | | |
|---|---|---|---|---|---|---|---|
| | 13 | 14 | 15 | 16 | 17 | 18 | 19 |
| $SiO_2$ | 49.45 | 50.00 | 51.00 | 51.50 | 53.50 | 55.00 | 60.00 |
| $B_2O_3$ | 2.00 | 1.00 | 1.50 | 1.00 | 2.00 | 1.00 | 1.00 |
| $Al_2O_3$ | 3.00 | 1.00 | | 1.00 | 1.00 | 0.50 | |
| $TiO_2$ | 18.00 | 16.00 | 16.00 | 17.00 | 16.00 | 16.50 | 16.00 |
| $ZrO_2$ | | 1.00 | 0.40 | | | | 0.40 |
| $WO_3$ | | 1.00 | | | | 0.90 | |
| ZnO | | 0.90 | | 3.00 | | 1.00 | |
| CaO | 1.00 | 3.00 | 0.40 | 1.00 | | 1.00 | 0.50 |
| SrO | | 0.50 | | | 2.00 | | |
| BaO | 12.50 | 13.50 | 11.00 | 12.50 | 11.00 | 11.00 | 11.00 |
| $Na_2O$ | 7.00 | 2.00 | 1.60 | 6.00 | 2.00 | 7.00 | 1.00 |
| $K_2O$ | 7.00 | 10.00 | 18.00 | 6.00 | 12.00 | 6.00 | 10.00 |
| $Sb_2O_3$ | 0.05 | 0.10 | 0.10 | 1.00 | 0.50 | 0.10 | 0.10 |
| nd | 1.62906 | 1.63236 | 1.614142 | 1.629054 | 1.609969 | 1.618342 | 1.602889 |
| vd | 37.6 | 39.2 | 39.6 | 38.3 | 39.7 | 38.8 | 39.5 |

TABLE 4

| No. | Examples | | Comparative Examples | | |
|---|---|---|---|---|---|
| | 20 | 21 | A | B | C |
| $SiO_2$ | 52.40 | 45.00 | 46.6 | 38.1 | 55.0 |
| $B_2O_3$ | 4.50 | 1.00 | | | 10.0 |
| $Al_2O_3$ | 3.00 | 1.00 | 0.1 | | 3.0 |
| $TiO_2$ | 16.00 | 19.00 | | | 15.0 |
| $Nb_2O_5$ | | | | | 2.0 |
| ZnO | | | 6.0 | 5.5 | |
| CaO | 1.50 | 3.00 | | | |
| SrO | | | | | |
| BaO | 11.50 | 13.90 | 6.0 | 17.4 | 7.0 |
| $Li_2O$ | | | | | 8.0 |
| $Na_2O$ | 4.50 | 7.00 | 3.0 | 3.0 | |
| $K_2O$ | 6.50 | 10.00 | 6.0 | 3.8 | |
| PbO | | | 31.7 | 31.4 | |
| $Sb_2O_3$ | 0.10 | 0.10 | 0.2 | | |
| $As_2O_3$ | | | 0.4 | 0.8 | |
| nd | 11.60676 | 1.65430 | 1.6072 | 1.6513 | 1.6366 |
| vd | 39.5 | 37.0 | 40.4 | 38.3 | 41.9 |

The glass of Comparative Example A is one obtained by correcting the composition of the above described prior art flint glass BaSF3 so that the total amount of all ingredients of the glass will become 100% and this glass contains 31.7% PbO and 0.4% $As_2O_3$ as shown in Table 4. In contrast, glasses of Examples Nos. 17 and 18 which have optical constants which are almost equivalent to those of Comparative Example A are free of PbO and $As_2O_3$ and also free of expensive $Nb_2O_5$ and $Ta_2O_5$ and, therefore, these glasses can be manufactured at a low cost without causing the problem of environmental pollution.

The glass of Comparative Example B is one having the same composition as that of the above described prior art flint glass BaSF4 and contain 31.4% PbO and 0.8% $As_2O_3$ as shown in Table 4. In contrast, the glass of Example No. 1 shown in Table 1 which has optical constants which are almost equivalent to the glass of Comparative Example B is free of PbO and $As_2O_3$ and is also free of expensive $Nb_2O_5$ and $Ta_2O_5$ and, therefore, this glass can be manufactured at a low cost without causing the problem of environmental pollution.

The glass of Comparative Example C is one which has optical constants within the target ranges of the present invention and contains the least amount of $Nb_2O_5$, i.e., 2%, among the glasses whose compositions are specifically disclosed in the above described prior art publications.

Comparing the cost of raw materials per 1 kg of essential ingredients of the optical glass of the present invention, the cost of the $B_2O_3$ ingredient is about double that of the $SiO_2$ ingredient which is of the lowest cost of all raw materials, the cost of the $TiO_2$ ingredient is about eight times as high as that of the $SiO_2$ ingredient and the costs of the BaO and $K_2O$ ingredients respectively are about 3 times as high as that of the $SiO_2$ ingredient whereas the cost of the $Nb_2O_5$ ingredient is about eighty times as high as that of the $SiO_2$ ingredient. Therefore, addition of only 2.0% of the $Nb_2O_5$ ingredient substantially increases the cost of raw materials of the glass.

As shown in Tables 1 to 4, the glasses of the examples other than those described above are free of PbO and $As_2O_3$ and also free of expensive $Nb_2O_5$ and $Ta_2O_5$ and, therefore, they can be likewise manufactured at a low cost without causing the problem of environmental pollution.

For manufacturing the optical glasses of Examples Nos. 1–21, conventional raw materials such as oxides, carbonates, nitrates and hydroxides were mixed and weighed at a predetermined ratio to constitute the compositions shown in the tables. These raw materials were put in a platinum crucible, melted at a temperature within a range from 1150° C. to 1350° C. for about three to five hours depending upon the melting property imparted by the composition, and were stirred and homogenized. The melt was cast into a mold and annealed and these optical glasses were easily manufactured.

As described in the foregoing, the optical glass of the present invention is a $SiO_2$—$B_2O_3$—$TiO_2$—BaO—$K_2O$ system glass of a specific composition which is free of expensive $Nb_2O_5$ and $Ta_2O_5$ and also is free of PbO and, therefore, can be manufactured at a low cost without causing the environmental pollution during manufacturing and processing of the glass. Moreover, the optical glass of the present invention has the advantage that, in a case where glass materials are melted in a large scale production, the melting time can be substantially shortened as compared with a glass containing $Nb_2O_5$ and, therefore, has an advantageous industrial utility in this point also. Furthermore, the optical glass of the present invention which is free of $As_2O_3$ as a refining agent has the advantage that risk of environmental pollution is further reduced.

What is claimed is:

1. An optical glass comprising, in mass %,

| | |
|---|---|
| $SiO_2$ | 40–60% |
| $B_2O_3$ | 1 to less than 5% |
| $Al_2O_3$ | 0–3% |
| $TiO_2$ | 15.5–19% |
| $ZrO_2$ | 0–1% |
| $WO_3$ | 0–5% |
| ZnO | 0–5% |
| CaO | 0–4% |
| SrO | 0–10% |
| BaO | 10.5–20% |
| $Na_2O + K_2O$ | 11–20% |
| in which $Na_2O$ | 0–9% |
| and $K_2O$ | 6–20% |
| a refining agent | 0–1% | and having optical constants of a refractive index (nd) within a range from 1.55 to less than 1.67 and an Abbe number (vd) within a range from 30 to 45.

2. An optical glass comprising, in mass %,

| | |
|---|---|
| $SiO_2$ | 45–60% |
| $B_2O_3$ | 1 to less than 5% |
| $Al_2O_3$ | 0–3% |
| $TiO_2$ | 16–19% |
| $ZrO_2$ | 0–1% |
| $WO_3$ | 0–5% |
| ZnO | 0–5% |
| CaO + SrO + BaO | 11–20% |
| in which CaO | 0–4% |
| SrO | 0–8% |
| and BaO | 11–20% |
| $Na_2O + K_2O$ | 11–20% |
| in which $Na_2O$ | 0–9% |
| and $K_2O$ | 6–20% |
| a refining agent | 0–1% | and having optical constants of a refractive index (nd) within a range from 1.55 to less than 1.67 and an Abbe number (vd) within a range from 30 to 45.

3. An optical glass as defined in claim 1 or 2 which comprises $Sb_2O_3$ in an amount of 0–1% in mass % as the refining agent.

* * * * *